United States Patent [19]

Scharamm et al.

[11] Patent Number: 5,052,282
[45] Date of Patent: Oct. 1, 1991

[54] VENTILATION SYSTEM FOR A MOTOR VEHICLE

[75] Inventors: Michael Scharamm, Neustadt/Coburg; Klaus-Dieter Knöppel, Ludwigsburg; Reinhold Ross, Schwieberdingen, all of Fed. Rep. of Germany

[73] Assignees: Siemens Aktiengesellschaft Berlin und München Wittelsbacherplatz; Süddeutsche Kühlerfabrik Julius Fr. Behr GmbH & Co., both of Fed. Rep. of Germany

[21] Appl. No.: 339,103

[22] Filed: Apr. 17, 1989

[30] Foreign Application Priority Data

Apr. 15, 1988 [DE] Fed. Rep. of Germany ....... 3813116
Dec. 8, 1988 [DE] Fed. Rep. of Germany ....... 3841345

[51] Int. Cl.⁵ .............................................. B60H 1/00
[52] U.S. Cl. ........................................ 98/2; 98/2.08; 237/12.3 A

[58] Field of Search ................ 98/2, 2.05, 2.08, 2.11; 165/42, 43; 237/12.3 A, 12.3 B

[56] References Cited

U.S. PATENT DOCUMENTS 2,660,944 12/1953 French ........................................ 98/2
3,895,650 7/1975 Cadiov ............................ 137/625.44 X

FOREIGN PATENT DOCUMENTS 3820412 1/1989 Fed. Rep. of Germany ... 237/123 A
8713 1/1981 Japan ............................. 237/12.3 A
2064824 6/1981 United Kingdom .......... 237/12.3 A Primary Examiner—Harold Joyce
Attorney, Agent, or Firm—Evenson, Wands, Edwards, Lenahan & McKeown

[57] ABSTRACT

In a ventilation system for a motor vehicle, the actuating of two or more air flaps arranged inside a housing takes place by means of a single driven cam plate, in the guiding cams of which the pilots are guided of the lever mechanisms of the air flaps. The cam plate and the lever mechanisms are disposed directly at a wall of a housing.

13 Claims, 4 Drawing Sheets

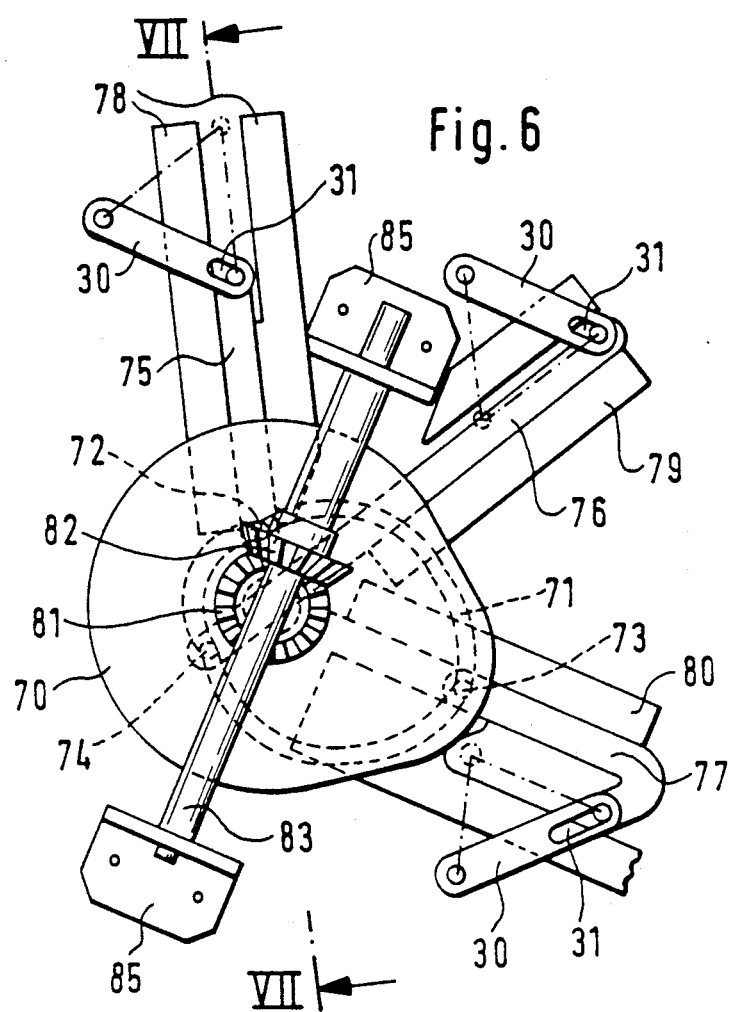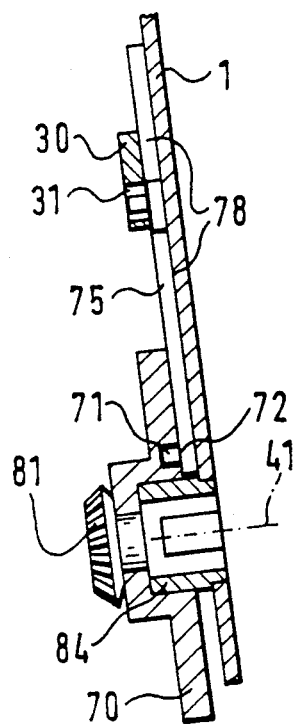

VENTILATION SYSTEM FOR A MOTOR VEHICLE

BACKGROUND AND SUMMARY OF THE INVENTION

The invention concerns the field of automobile air-conditioning technology and relates to a ventilation system for a motor vehicle having air flaps, which are arranged inside a housing and can be adjusted for the control of air flows. At least two of the air flaps are connected by means of a transmission mechanism to a cam plate which can be rotated around an axis and has at least one guiding cam for guiding a pilot of a lever of the respective transmission mechanism.

Ventilation systems of motor vehicles, among other things, have a housing, in which a fan, a heat exchanger, possibly an evaporator, various air flaps and various air ducts are arranged. The various air flaps are, among other things, used for controlling those amounts of air which are supplied to the foot area of the rear space, to the air nozzles in the dashboard and to the defrosting nozzle at the windshield. As a rule, the control of the corresponding air flaps takes place by means of turning knobs or slider controls from the dashboard (DE-A) 27 42 670, (DE-A) 37 05 630.

For the operation of ventilation systems of this type, an operating unit is known which makes it possible to control at least two air flaps by means of one turning knob or button. For this purpose, a bevel-gear transmission is provided which is coupled with the turning knob, two guide grooves being provided at the driven bevel-gear wheel, the respective pilot of an adjusting lever engaging in these guide grooves. At each adjusting lever, a Bowden cable is fastened which is connected with the respective air flap (DE-A) 34 34 302. Also known is the actuating of an individual adjusting lever by means of a rotatable cam plate having a guiding cam (DE-A) 25 57 077, (FR-A) 2 423 815.

It is also known (JP-A) 56-124511 to provide a stationarily arranged mounting plate, at which another plate is rotatably mounted which, by means of transmission levers, are connected with actuating levers of air flaps. A linear actuating drive is provided between a coupling point of the mounting plate and a coupling point of the rotatable plate. One of the transmission levers engages by means of a pilot in a guide slot of the plate. The other transmission levers have guide slots, into which pins of the rotatable plate engage.

In a known ventilation system of the initially mentioned type (EP-A) 0 149 397, the cam plate is fastened at the dashboard of a motor vehicle and can be rotated by means of a turning knob or button. The cam plate is provided with a guiding cam, in which pilots of two levers are guided. The levers are pivotably coupled by means of Bowden cables or rods with actuating levers of one air flap respectively.

An object of the invention is to develop a ventilation system of the initially mentioned type such that the constructive expenditures are reduced and the mounting and adjusting are facilitated.

This object is achieved in that the cam plate is disposed at a wall of the housing, in that lever mechanisms are provided as the transmission mechanisms, and in that the levers provided with the pilot are also disposed at the wall of the housing.

By means of the direct arrangement of the cam plate at a wall of the housing, it is achieved that only one transmission device for the turning of the cam plate must extend from the dashboard to the housing. This also results in the special advantage that the housing with the air flaps and the air flap drives can be completely assembled and adjusted before it is then installed as a completely assembled and adjusted structural unit into the vehicle.

In an advantageous embodiment, it is provided in this case that a rotary drive is connected to the cam plate and is held at the wall of the housing. This manual or motor drive is therefore also part of the preassembled structural unit.

In this type of a development of the ventilation system, only one single drive train is required for driving the jointly controllable air flaps, such as a bendable shaft or an actuating drive which is coupled with a rotary switch. This is achieved by arranging the cam plate in direct proximity of the air flaps, to be controlled directly from the cam plate by way of a lever mechanism. In this case, the cam plate—according to the requirement—may be provided with one or several guiding cams which are either open or closed in themselves. The geometry of the guiding cams, n this case, should be selected corresponding to the desired dependencies of the positions of the air flaps.

The cam plate used for controlling the lever mechanisms preferably has at least one guiding cam on both sides, each guiding cam engaging with the pilot of at least one lever mechanism. The number of the respectively provided guiding cams, in this case, depends on the number of air flaps to be controlled and the respectively selected dependency of the air flaps with respect to one another. For a special embodiment, in which, by means of the cam plate, the three air flaps are provided for adjusting the air flows to the foot area and to the central plane of the vehicle interior as well as to the windshield (defrosting nozzle), it was found to be particularly expedient for each guiding cam of the cam plate to be closed in itself and to have three guiding areas which each extend over an angle of rotation of 120°. In this case, one guiding area causes a constant position of the respective pilot, and the two other guiding areas cause a continuous shifting of the respective pilot radially toward the inside or radially toward the outside. In this case, the mutual assignment of the lever mechanisms is to be selected such that the three pilots of the three lever mechanisms engage in the guiding cam(s) while they are each offset by 120° with respect to one another. This development of the actuating device has the result that the air flows for the central plane and the foot area are controlled in opposite directions, that the air flow for the defrosting nozzle can be controlled in the opposite direction to the air flow of the central plane as well as in the opposite direction to the air flow of the foot area, and that there are positions, in which the full air flow is guided to the central plane, to the foot area and to the defrosting nozzle, respectively.

For the control of the air flaps by means of the cam plate, a lever mechanism is suitable which comprises two single-armed levers with the interposition of a coupling device. In this case, one lever is connected fixedly with the rotatable air flap, and the other lever, with its movable end, is guided in the guiding cam of the cam plate. This type of lever mechanism may be called a four-joint transmission with pure hinge joints. For the above-mentioned special motion program of three air flaps, three identically guided levers may be used, if the axes of rotation of these levers are arranged on a reference circle which is concentric with respect to the axis of rotation of the cam plate, and, for this purpose, the levers have the same lever length.

For the control of the air flaps according to the mentioned special motion program, a lever mechanism may, however, also be used which, in each case, consists of an oscillating lever guided in the guiding cam of the cam plate and of a single-armed lever which is pivotally connected with this oscillating lever and is connected with the respective air flap, the pivotally connected lever having an oblong hole for the guiding of the oscillating lever, and the oscillating levers, for the adjusting of the air flaps for the foot area and the defroster nozzle, having a common axis of rotation, and being constructed identically and arranged mirror-symmetrically. In this case, each lever mechanism requires only two very simply constructed lever parts.

Other objects, advantages and novel features of the present invention will become apparent from the following detailed description of the invention when considered in conjunction with the accompanying drawings.

BRIEF DESCRIPTION OF THE DRAWINGS

FIG. 6 is a schematic side view of another embodiment having levers guided in sliding guides; and FIG. 7 is a partial sectional view taken along Line VII—VII of the embodiment according to FIG. 6.

DETAILED DESCRIPTION OF THE DRAWINGS

Figure 1:
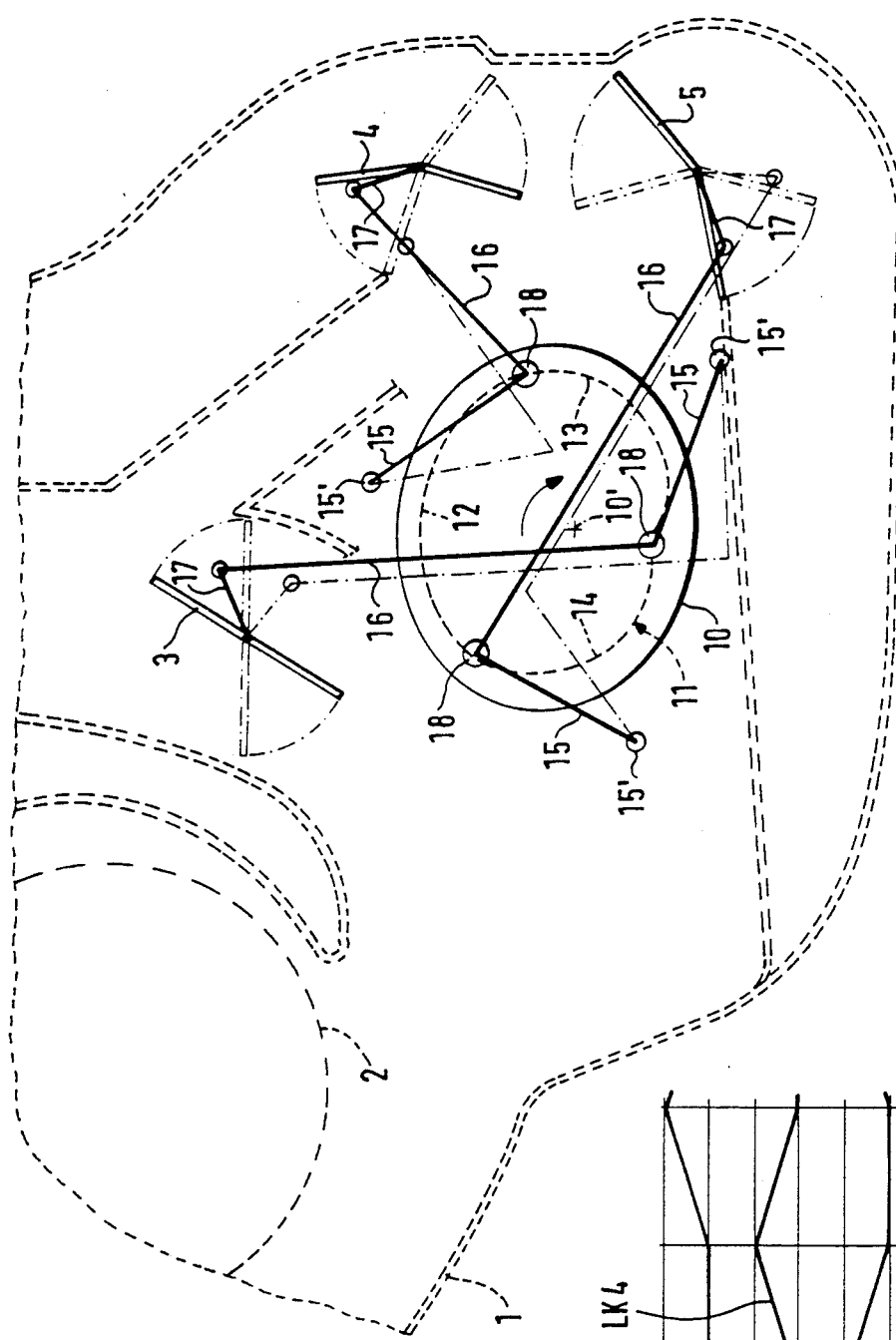
FIG. 1 is a schematic side view of a ventilation system having a lever mechanism comprising two single-armed levers with an interposed connecting rod and a cam plate with a single guiding cam, constructed according to a preferred embodiment of the invention.

By means of dashed lines, FIG. 1 shows the contours of a housing 1 of a ventilation system in a passenger motor vehicle, in which a fan 2 is arranged as well as three air flaps. These air flaps consist of air flap 3, by means of which an air flow is controlled to the central plane in the dashboard of the motor vehicle, of air flap 4 for the control of an air flow to the defrosting nozzle and of air flap 5 for the control of the air flow to the passenger foot area. The cam plate 10, in a manner not shown in detail, is disposed directly at the wall of the housing 1, which is not shown in detail, or is disposed by means of a holding part fastened at the housing wall, this cam plate 10 having an axis of rotation 10'. The cam plate 10 has a guiding cam 11 which is closed in itself, is shown by a dashed line and has three guiding sections, each covering an angle of 120°, namely guiding section 12 with a continuous distance to the axis of rotation 10', guiding section 13 with a decreasing distance to the axis of rotation 10' and guiding section 14 with an increasing distance to the axis of rotation 10'. The cam plate 10 is driven, for example, by an actuating drive or manually by means of a flexible shaft.

The air flaps 3, 4, 5 are each coupled with the cam plate 10 by means of a lever mechanism. This lever mechanism consists of the single-armed lever 15, the coupling device 16 and the single-armed lever 17. The single-armed lever 17 is, in each case, fixedly connected with an air flap. The single-armed levers 15, with their one end, are disposed at the wall of the housing 1 (also directly or by means of a holding part fastened at the housing wall), and with their movable end, by means of a pilot 18, are guided in the guiding cam 11. The coupling devices 16 of the individual lever mechanisms have different lengths. The levers 15 have the same length and are arranged such that their axes of rotation 15' are located on a reference circle which extends concentrically with respect to the axis of rotation 10' of the cam plate 10. As a result, the journals 18 engage in the guiding cam 11, each being offset by 120° with respect to one another.

The shown position of the cam plate 10 and of the air flaps 3 to 5 corresponds to one end position of the air flaps. When the cam plate is turned by 120° or 240° in one or the other direction, the air flaps, as a function of the position on the guiding cam 11, take up the respective other end position shown by an interrupted line.

Figure 3:
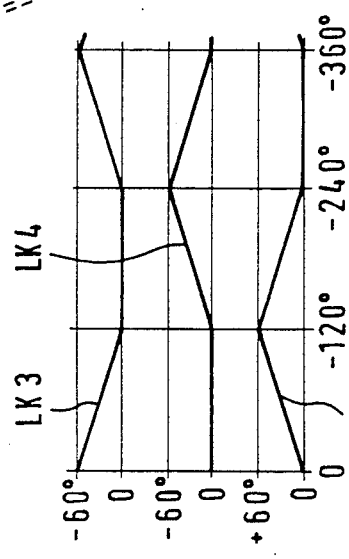
FIG. 3 is a diagram graphically depicting a motion program of three air flaps controlled in accordance with preferred embodiment of the invention.

The cam plate 10 and the lever mechanisms of the air flaps 3 to 5 are coordinated with one another such that the air flaps (LK) execute the motion program shown in FIG. 3. The abscissa of the diagram shows the pivoting angle of the cam plate 10, and the coordinate shows the position of the respective air flap within a maximum pivoting angle of 60°.

Figure 2:
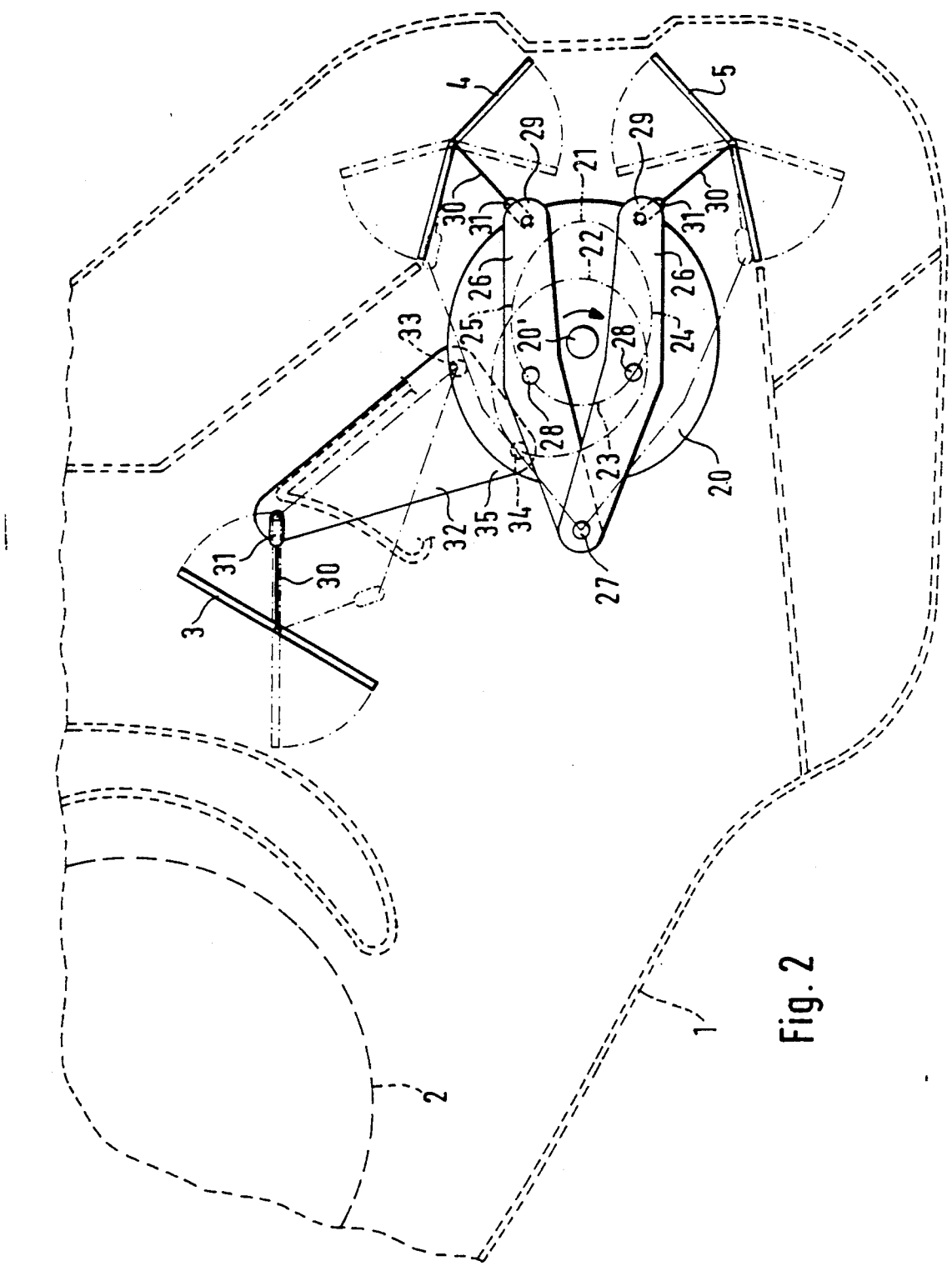
FIG. 2 is a schematic side view of a ventilation arrangement having a lever mechanism consisting of an oscillating lever and a pivotally connected single-arm lever as well as of a cam plate having two identical guiding cams arranged on both sides, constructed according to another preferred embodiments of the invention.

The embodiment according to FIG. 2, in the same manner as FIG. 1, shows the housing 1 shown by an interrupted dashed line with a fan 2 and the air flaps 3, 4, 5. For the actuating of the air flaps, a cam plate 20 is provided which can be driven around the axis of rotation 20', this cam plate 20, on one side, being provided with the guiding cam 21, which is closed in itself and, on the other side, with an identical guiding cam 22 which, however, is offset by 120°. Each guiding cam has a guiding section 23 with a continuous distance to the axis of rotation 20', a second guiding section 24 with an increasing distance to the axis of rotation 20' and a third guiding section 25 with a decreasing distance to the guiding axis 20'. Each guiding section covers an angle of rotation of 120°.

Each of the air flaps 3, 4, 5 is equipped with a single-armed lever 30 which has an oblong hole 31 at its movable end. One oscillating lever 26 respectively is hinged to the lever 30 of the air flaps 4, 5. Both oscillating levers can be rotated around a common pivot 27 disposed in or at the housing wall. Between the pivot 27 and the movable end of each oscillating lever, a pilot 28 is provided approximately at half the length of the oscillating lever, this pilot 28 engaging in the guiding cam 21. The two oscillating levers 26 are identical with respect to their shape and their dimensions. They are mounted mirror-invertedly. Only one tool is required for producing these two oscillating levers which expediently consist of a plastic material.

A double-armed oscillating lever 32 is hinged to the lever 30 of the air flap 3. The pivot 33 of this oscillating lever which is disposed in or at the housing wall, is located between the two ends of the oscillating lever, the other end 35 of the oscillating lever being provided with the pilot 34. The pilot 34 engages in the guiding cam 22 on the other side of the cam plate 20. When the cam plate 20 is rotated by 360°, the air flaps (LK 3, 4, 5) also carry out the motion program shown in FIG. 3.

Figure 4:
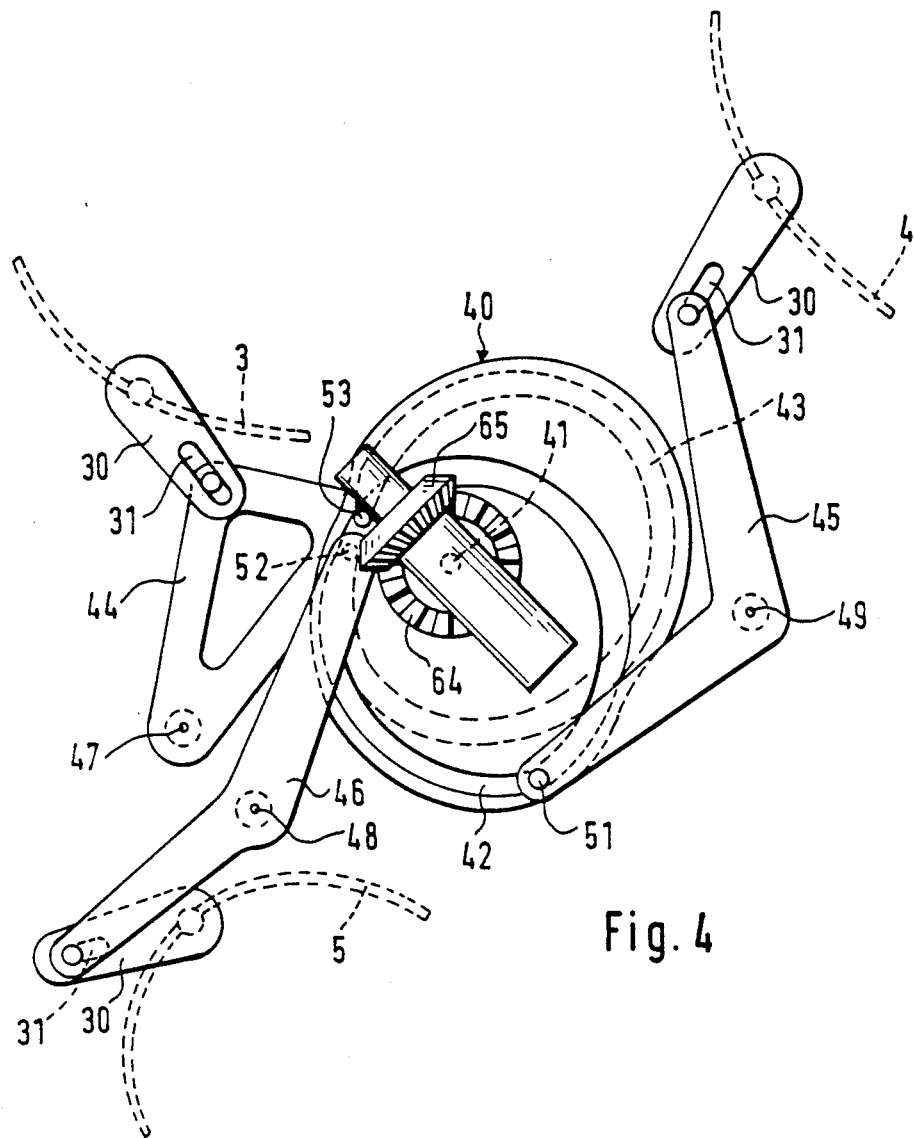
FIG. 4 is a schematic side view of another embodiment having a cam plate which is driven by means of a rotary drive and has two guiding cams.
Figure 5:
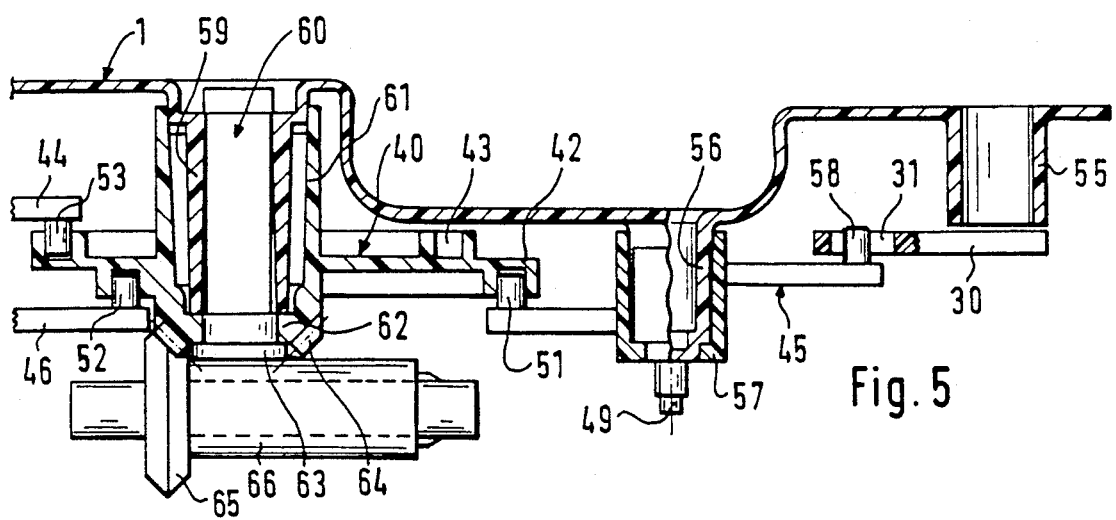
FIG. 5 is a differently scaled partial sectional view of the embodiment according to FIG. 4.

Also in the embodiment according to FIG. 4 and 5, a common cam plate 40 is provided which is disposed directly at a wall of the housing 1 and which, by means of lever mechanisms, drives the three air flaps 3, 4, 5. The cam plate 40, which can be pivoted around an axis 41, on its top side and on its bottom side, has one guiding cam 42, 43 respectively in the form of surrounding grooves. A pin 53 of a transmission lever 44 engages in the guiding cam 43 facing the wall of the housing 1, this transmission lever 44, being disposed at the wall of the housing around an axis 47. The transmission lever 44, by means of an oblong hole 31, is hinged to a lever 30 which is nonrotatably connected with a shaft or a shaft end of the air flap 3.

A pin 51 of a transmission lever 45 engages in the guiding cam 42 facing away from the wall of the housing 1, this transmission lever 45, being displaced at the wall of the housing 1 for pivotal movement around an axis 49. This transmission lever 45 is hinged by means of an oblong hole 31 to a lever 30 which is nonrotatably connected with the air flap 4. A pilot 52 of a transmission lever 46 also engages in the guiding cam 42, this transmission lever 46 being disposed at the wall of the housing 1 for pivotal movement around an axis 8. This transmission lever 46 is hinged by means of an oblong hole to a lever 30 which is nonrotatably connected with the air flap 5. The course of the guiding cams 42, 43 determines the motion program of the air flaps 3, 4, 5 which these air flaps 3, 4, 5 carry out when the cam plate 40 is rotated. In this case, a motion program corresponding to FIG. 3 or also a motion program which deviates from that program can be determined by the corresponding fixing of the guiding cams 42, 3. Since the guiding cams 42, 43 rotate continuously, the cam plate 40 may be rotated by 360°.

The air flaps 3, 4, 5 are equipped with shafts or journals which, in a manner that is not shown in detail, are disposed in bearing receptacles 55 molded onto the wall of the housing 1. The levers 30 are nonrotatably connected with the shafts or shaft ends of the air flaps 3, 4, 5, for the purpose of which these shafts or shaft ends, at their end, are provided with a profile, such as a square profile, onto which the levers 30 are fitted by means of a corresponding recess.

The levers 44, 45, 46 are also disposed directly at the wall of the housing 1 in a manner which is shown in detail in FIG. 5 for lever 45. Bearing journals 56 are molded to the wall of the housing 1, a bearing sleeve 57 of the respective lever being fitted onto the bearing journals 56. The bearing sleeve 57 is axially secured at the bearing journal 56 in a manner not shown in detail, particularly by means of a clips connection. In axial direction, the bearing sleeve 57 and the bearing journal 56 are fixed with respect to one another by means of ring shoulders. At the bearing sleeve 57, a lever arm is mounted having the pilot 51, which engages in the guiding cam 42, and a lever arm having a pin 58 engaging in the oblong hole 31 of lever 30.

For receiving the cam plate 40, a journal 59 is also molded to the wall of the housing 1. A bearing pin 60, which has a profiled shaft, such as a square, to which the inner contour of the bearing journal 59 is adapted, is inserted into this bearing journal 59. As a result, the bearing pin 60 can be mounted at the housing 1 only in a predetermined angular position. The bearing pin 60 supports itself by means of a ring shoulder on the outside at the bearing journal 59 and, in axial direction, on the inside, is fixed by means of a clip connection or a screwed connection or the like. The cam plate 40 is constructed in one piece with a bearing sleeve 61, by means of which it is fitted onto the bearing journal 59. In radial direction, it is guided, with its edge facing the wall of the housing 1, on a collar-type projection of the bearing journal 59. Also, the bearing sleeve 61 of the cam plate 40, at its opposite edge, is provided with a collar 62 by means of which it is radially disposed on a corresponding collar of the bearing pin 60. The collar 62 of the bearing sleeve 61 of the cam plate 40, in axial direction, is held between the end of the bearing journal 59 and a ring shoulder 63 of the bearing pin 60.

The drive of the cam plate 40 takes place by means of a bevel gearing. For this purpose, the edge of the bearing sleeve 61, which faces away from the wall of the housing 1, is constructed as a bevel wheel 64. A bevel wheel 65 mates with the bevel wheel 64 of the cam plate 40, this bevel wheel 65 being disposed in a bearing housing 66 molded to the bearing pin 60. The bevel wheel 65 is nonrotatably arranged on a shaft 67, to which a drive shaft can be connected by means of a coupling connection, for example, a bendable shaft which, in a manner not shown in detail, extends to a driving element arranged in the dashboard of the corresponding vehicle. Since the cam plate 40 with its bevel wheel 64 is disposed on the bearing pin 60 which carries the bearing housing 66 and thus the bevel wheel 65, a precise assignment of the bevel wheels 64, 65 is ensured.

On the whole, a construction is obtained which can be manufactured easily and at low cost, because the wall of the housing 1 with the bearing receptacle 55, the bearing journal 56 and the bearing pin 59 as well as the transmission levers 44, 45, 46 with the molded-on bearing sleeves 57 and also the cam plate 40 with the molded-on bevel wheel 64 as well as the bearing pins 60 with the bearing housing 66 are manufactured as plastic preforms. In addition to this relatively simple manufacturing and the easy assembling, there is the special advantage that the housing 1 with the flaps 3, 4, 5, the cam plate 40 and the bevel wheel drive 64, 65 as well as with the transmission levers 44, 45, 46 can be preassembled as a structural unit which, as such, is then installed into a motor vehicle. As a result, it becomes possible, in a simple manner, to achieve a precise adjusting and assignment of the positions of the individual air flaps 3, 4, 5 with respect to one another and with respect to the driving element which is not shown.

In the embodiment according to FIG. 6 and 7, the cam plate 70, on its side facing one wall of the housing 1, is provided with a guide 71 constructed as a radial cam, which is developed as a surrounding groove. Pilots 72, 73, 74 which are mounted at levers 75, 76, 77 engage in this guide 71, which levers are each guided in sliding guides 78, 79, 80 mounted at the wall of the housing 1 and thus are driven by the cam plate 70 to perform linear movements. The levers 75, 76, 77 are each hinged by means of pins to levers 30 which are nonrotatably arranged on the shafts of the flaps 3, 4, 5. These levers 30 each have an oblong hole 31 extending in their longitudinal direction, on which the pins are guided.

In the embodiment according to FIG. 6 and 7, a common guide 71 is provided on the bottom side of the cam plate 70 facing the housing 1, the pilots 72, 73, 74 of all levers 75, 76, 77 engaging in this guide 71. However, it is also contemplated to provide two or more guides in the cam plate 74 so that their own guides are assigned to one or all flaps 3, 4, 5. These guides may then be mounted on the top side as well as on the bottom side of the cam plate 70. In addition, it is contemplated to use the outer circumference of the cam plate 70 is a guide and to then provide that the corresponding lever 75, 76 or 77 is loaded by means of a spring in the direction toward the outer circumference of the cam plate 70.

The cam plate 70 is disposed on a bearing sleeve 84 at the exterior side of the housing 1 (FIG. 7). It is nonrotatably connected with a bevel wheel 81 which mates with a bevel wheel 82. The bevel wheel 82 is nonrotatably arranged on a shaft 83 which is arranged in two tabs 85 mounted on the exterior side of the housing 1. One end of this shaft 83 is constructed as a connection, for example, as a profiled receptacle, into which a counterpart is fitted of a bendable shaft or another drive.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A ventilation system for a motor vehicle comprising:
   a housing;
   air flaps arranged inside the housing and which are adjustable for controlling air flows;
   a cam plate rotated around a shaft and having at least one guide;
   lever mechanisms provided as transmission mechanisms, at least some of said lever mechanisms having a lever with a pilot, said pilot being guided in said guide, said lever mechanisms connecting at least two flaps of the plurality of flaps to the cam plate;
   wherein the cam plate is disposed at a wall of the housing, and the levers of the lever mechanisms provided with the pilots are also disposed at the wall of the housing.

2. A ventilation system according to claim 1, further comprising a rotary drive connected to the cam plate, this rotary drive being held at the wall of the housing.

3. A ventilation system according to claim 2, further comprising a first bevel wheel which is disposed at the wall of the housing and is connectable with a driving element, and wherein the rotary drive contains a second bevel wheel which is nonrotatably connected with the cam plate, and which mates with the first bevel wheel.

4. A ventilation system according to claim 1, wherein the cam plate has at least one guiding cam on both sides, and wherein each guiding cam engages with the pilot of at least one lever mechanism.

5. A ventilation system according to claim 2, wherein the cam plate has at least one guiding cam on both sides, and wherein each guiding cam engages with the pilot of at least one lever mechanism.

6. A ventilation system according to claim 1, wherein the cam plate includes guiding cams, which are closed in themselves and which extend over 360°.

7. A ventilation system according to claim 6, wherein each guiding cam has at least two guiding areas, of which one guiding area causes a continuous displacement of a pilot radially toward the inside, and the other guiding area causes a continuous displacement of the pilot radially toward the outside with respect to an axis of rotation of the cam plate.

8. A ventilation system according to claim 7, wherein at least one guiding cam has a section with a constant distance to the axis of rotation of the cam plate.

9. A ventilation system according to claim 1, wherein each lever mechanism consists of two single-armed levers with an interposed coupling device.

10. A ventilation system according to claim 8, wherein the axes of rotation of the guided levers are arranged on a reference circle which is concentric with respect to the axis of rotation of the cam plate, and wherein the guided levers have the same lever length.

11. A ventilation system according to claim 1, wherein each lever mechanism consists of a lever guided in the guiding cam and of a single-armed lever which is hinged to this guided lever and is connected with the respective air flap, the hinged lever having an oblong hole for the guiding of the lever.

12. A system according to claim 1, wherein the levers are arranged at the wall of the housing and are guided in linear guides, each of said levers, being guided by means of a pilot, in or at a guide of the cam plate.

13. A system according to claim 11, wherein the levers are arranged at the wall of the housing and are guided in linear guides, each of said levers, being guided by means of a pilot, in or at a guide of the cam plate.

* * * * *

UNITED STATES PATENT AND TRADEMARK OFFICE
CERTIFICATE OF CORRECTION

PATENT NO. : 5,052,282

DATED : October 1, 1991

INVENTOR(S) : Michael Schramm, et al.

It is certified that error appears in the above-identified patent and that said Letters Patent is hereby corrected as shown below:

ON THE TITLE PAGE:   Item [19] & [75]

Please change the first inventor's name from:

Michael Scharamm to  Michael Schramm

Signed and Sealed this

Ninth Day of February, 1993

*Attest:*

STEPHEN G. KUNIN

*Attesting Officer*    *Acting Commissioner of Patents and Trademarks*